Dec. 8, 1925.

1,564,932

L. H. BROWN

MEANS TO ASSIST IN PURGING PAPERS

Filed April 12, 1923    2 Sheets-Sheet 1

Fig. 1.

Inventor:
Lewis H. Brown.
By Wallace R. Lane.
Atty.

Dec. 8, 1925.
L. H. BROWN
1,564,932
MEANS TO ASSIST IN PURGING PAPERS
Filed April 12, 1923   2 Sheets-Sheet 2
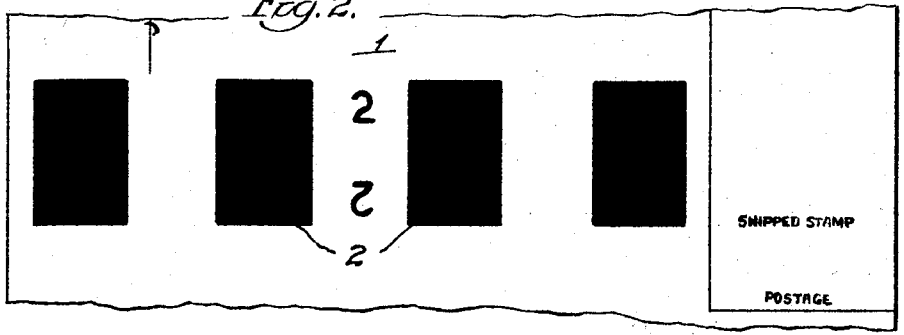
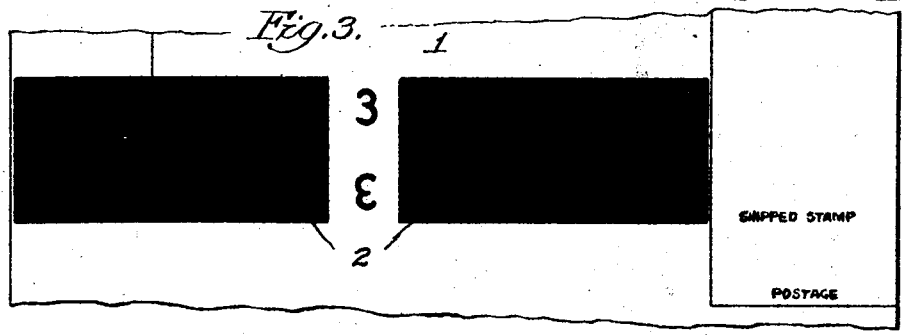
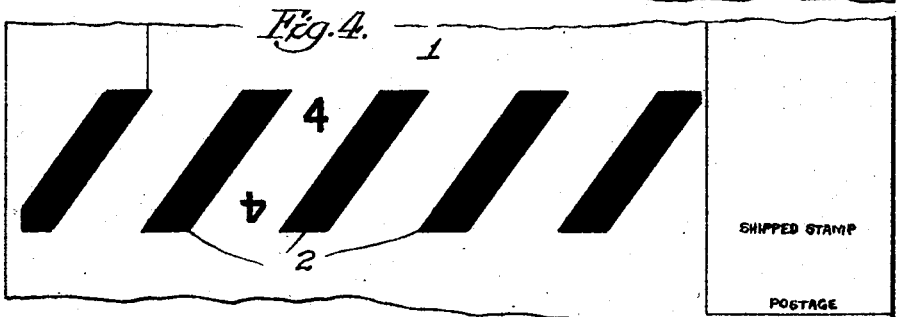
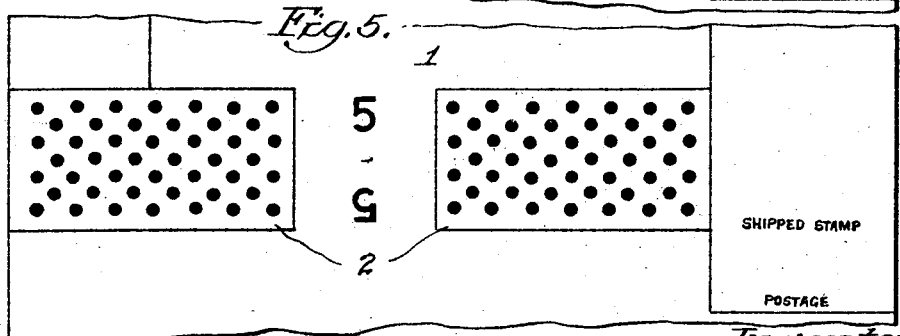
Inventor:
Lewis H. Brown.
by Wallace R. Lane
Atty.

Patented Dec. 8, 1925.

1,564,932

UNITED STATES PATENT OFFICE.

LEWIS H. BROWN, OF CHICAGO, ILLINOIS, ASSIGNOR TO MONTGOMERY WARD & CO., INC., OF CHICAGO, ILLINOIS.

MEANS TO ASSIST IN PURGING PAPERS.

Application filed April 12, 1923. Serial No. 631,488.

*To all whom it may concern:*

Be it known that I, LEWIS H. BROWN, a citizen of the United States, residing at Chicago, in the county of Cook and State of Illinois, have invented certain new and useful Improvements in Means to Assist in Purging Papers, of which the following is a specification.

While this invention is described with reference to its applicability for a particular purpose in a particular line of business, it is not to be understood that this is the only use to which the same may be put. The present description and annexed drawings are therefore to be considered merely as illustrative of the invention and not as defining the scope thereof.

Among the objects of my invention are to provide convenient means for indicating what papers should be removed from a file; to reduce the expense of indicating the age of papers; to provide means such that inexperienced help may be used for the purging of papers; to provide means such that it will be unnecessary to make use of varicolored papers to indicate when a particular paper or set of papers should be removed; and such further objects, advantages and capabilities as will later more fully appear.

My invention further resides in the combination, construction and arrangement of parts illustrated in the accompanying drawings, and, while I have shown therein a preferred embodiment of my invention, I desire the same to be understood as illustrative only and not as limiting said invention.

In the annexed drawings, Fig. 1 is a face view of an indicating member, or marker, provided with one of a plurality of selected indicating indicia. Figs. 2, 3, 4 and 5 are fragmentary views showing other selected indicating indicia used in lieu of the one shown in Fig. 1.

In the particular business for which the present forms were developed, there are a great many papers to be filed and these papers come from all parts of the country. It is therefore customary to file them alphabetically by State, town and name. It is obvious, that with this method of filing, papers of various ages must necessarily be promiscuously mixed together. Experience has shown that there is very little necessity for keeping the papers after a certain length of time; for example, three months after the time the papers were received and the business transaction made. In order that these papers may be quickly removed from file at a low cost in order to make room for other papers in the files, a different form of indicating sheet is attached to all papers being received during a certain length of period, for example, one month. Each succeeding month different indicating sheets are attached to the papers as they are received so that when all papers are filed alphabetically and mixed together according to various ages in the files, the papers are folded so that the indicating indicia are visible and will serve as a quick and easy means of removing from the files papers that have reached a designated age and are to be taken out and destroyed. The indicating sheets indicate the length of time the papers have been in the file. Any maximum time may be selected, but, in the present instance, the limit of time selected is three months, after which the papers will be removed from this file. It is of course obvious that any arbitrary time limit may be fixed, as, for example, two months or six months. Furthermore, the designs selected do not necessarily refer to months, but may be referred to any other arbitrary unit of time, as, for example, two weeks or six months.

It will be understood that if each paper had to be examined, individually, to determine its date, in order to know whether it should be removed from the files, the process would be very slow and expensive. Also, if colored papers were used to designate the different months, there would be the objection that colored papers are more expensive than white or unbleached papers. Furthermore, there would be the objection that the person examining the file would have to remember what particular unit of time a particular color related to and many more mistakes would be likely to occur than with a system such as the present. With the present system it is also possible to avoid double printing operation which would result from the use of colored ink for the status indicating designation. The forms may all be printed from a single plate merely by the substitution of one set-in plate for another to produce the different indicia. This, obviously, reduces the cost of the printing. By merely increasing or decreasing the number of designs used, or the length of time represented by one design, papers can be kept in a file for any desired period of time. Use of the present type of indicating indicia renders it possible to turn over the work of purging papers from a file to inexperienced or temporary help in case of emergency. The foregoing are a few of the many advantages of the present method of indicating what papers should be removed from a file.

In general the invention comprises a series of paper folders or wrappers adapted to be suitably folded to enclose or contain the various files of orders or correspondence. Each folder is provided with a blank space for the name of the customer or correspondent and other spaces for suitable indicia for routing the file through the various departments. In addition each folder is provided with a distinctive purging indicia or symbol by which that folder with its enclosed or attached file may be instantly recognized or identified while in rather closely packed, folded position in the file drawer. The distinctive purging indicia or symbols of the various folders are formed and arranged on each wrapper so as to provide a distinctive, unmistakable and conspicuous mark, which extends across the fold of the wrapper, wherever that fold occurs, and this fold is arranged to constitute the top or upper edge of the wrapper and file so that the mark may be seen and recognized in a packed drawer looked at from above, that is, where only the upper edges of the wrappers with their enclosed files are visible. This conspicuous purging mark is made wide enough so that it straddles the fold, that is, it extends across and somewhat down each face of the folder at the fold so that a portion of the mark will be visible even if the fold line is carelessly formed on the wrapper slightly to one side of its normal, intended location on the wrapper. Manifestly the location of the purging mark depends upon the manner in which the wrapper or folder is to be folded and the location of the fold line.

In order to explain my invention in detail I shall explain the broad principles thereof by reference to a specific embodiment thereof, the same being illustrated in the drawings. In this particular form, the obverse side of the paper blank is provided at one end, the top as seen in Figure 1, with a portion 3 which comprehends a horizontally arranged series of indicia receiving spaces 4 which are thus sub-divided by appropriate lines 5. These spaces are provided for the characteristic notations of various routing clerks such as typist, examiner, index clerk and order router. One of these spaces, 6, is designated by the caption "Pin here." This sub-divided portion 3 is adapted to be folded downwardly onto the remainder of the blank along the crease line 7 in a manner such that the indicia on portion 3 face outwardly. In other words, in this downwardly folded position the reverse sides of portion 3 and the remainder of the sheet are vis-à-vis.

Preferably the top edge of the file comprising the particular order blank or other correspondence to be filed away is inserted under the downwardly folded portion or flap 3 and the pin is passed through the various thicknesses, including the flap 3, the correspondence or order, and the portion of the remainder of the blank opposite the pin space 6. In this way the flap 3 is fastened in its folded position.

As viewed in Figure 1, immediately below the foldable portion or flap 3, the blank is provided with an appropriate space 8 to receive the name and address of the customer or correspondent who sent in the order, another space 9 or sub-division for the filing stamp, which stamp indicates when the order was first filed away.

Below this address portion, the blank is provided with the identifying zone 2 in which is positioned the means for quickly purging the folders as they are positioned in the usual closely packed arrangement in the filing drawer of the cabinet. This zone 2 in the embodiment of the invention illustrated is located substantially centrally of the blank.

In this area 2 are placed the indicating indicia which are different upon different sets of folders used in filing. In the present form of the invention, the indicating indicia in zone 2 shows that this folder, together with any paper or orders attached thereto, have been in the files for less than a prescribed length of time. When such prescribed time interval has elapsed, as indicated by that particular indicia, the folder and attached papers are purged from the file.

In the illustrated embodiment of my invention the form shown in Figure 1 is used to indicate the first month while those shown in Figures 2 to 5 inclusive designate respectively the second, third, fourth and fifth months. In addition, the invention contemplates means whereby any particular indicia may be quickly and positively identified as of a specific time interval, such as a month. In the present instance this is provided for by arranging numerals 10 in predetermined position relative to the indicia such that the same either will be visible constantly or can be seen when the folders in the file are ever so slightly separated. This will be adverted to presently.

The lower portion of the sheet 1 beneath the purging indicia zone 2, is provided with an indicia bearing sub-division 1' for additional data desired and beneath that with a second crease line 12 marked "Fold here," and finally, beneath that with a second foldable end flap 13 arranged with suitable subdivisional lines 14 to form data spaces 15, designated on the drawing with the various legends such as Billing typist, Re-checker and the like.

Folding flap 13 is adapted to be folded under and upwardly as viewed in Figure 1 so that the indicia is not visible from the obverse face of the blank. In other words the reverse face of flap 13 and the reverse face of portion 11 are vis-à-vis.

The blank thus arranged with the end flaps 3 and 13 folded back as hereinbefore described, and with the attached papers therein is now folded so that the second crease line 12 registers substantially with the crease line 7, the obverse faces of portions 8 and 11 being outermost. This operation will dispose the fold line of the wrapper which now corresponds to the upper edge of the wrapper or folder, midway of and transversely across the purging symbol located in this zone. Each symbol on a folder or wrapper is sufficiently wide, in a direction extending from top to bottom of the paper sheet 1, so that when the sheet is correctly folded as hereinbefore outlined, the symbol will straddle the fold line, substantially one half lying on each face of the folded wrapper. By thus making this purging symbol sufficiently wide it insures this straddling arrangement when the fold line does not lie substantially midway across the symbol, as when an operator carelessly folds the wrapper. In other words, if the fold line occurs somewhat above or below its normal or intended position, the purging symbol is wide enough to straddle the fold line and extend on both sides thereof.

When the folded wrappers or sheets with their inclosed file of papers are placed vertically in the drawer of the file cabinet, as is customary, these upper, fold line edges with the purging symbols extending thereacross and down each face, lie uppermost and constitute the top of the folder. Manifestly with a succession of these folders in a file drawer and in closely packed relation, only the tops of the folders are visible.

From the foregoing it is evident that these various designs are so formed and arranged as to provide a distinctive purging or identifying symbol which extends across the upper folded edge of the wrapper so that the purging device may be easily seen and quickly recognized in a packed drawer and particularly when viewing the files in the drawer from above in the customary manner.

The numerals designated as 10 on Figure 1 of the drawings are different for each variant form of purging symbol. These numerals 1 to 5 are used to indicate to the operator which months is beng purged. For instance, if all files are to remain in the filing drawer for a period of three months, then those files which were filed in January must remain there until the first of May, at which time folders with symbol number 5 or the dots are being used and the January folders or number 1, with the blank or white purging symbols are being purged. At the end of the month of May, which is June the first, the number 2 folders or the vertical striped symbols which were placed in file in February are being purged and the number 1 folders, are being used, and so on. In this way there is provided a positive means for determining whether or not the purging operator is purging the correct symbol, since the numeral thereon must correspond with its numerical turn in the cyclic succession of months or purging intervals. These numerals are arranged so that the fold line forming the upper edge of the folder falls between them and are preferably disposed in inverted relation so that they are easily readable from above. Manifestly each numeral of the spaced pair falls on opposite faces of the folder just below the top edge or fold line thereof.

It is of course understood that the specific description of structure set forth above may be departed from without departing from the spirit of my invention.

Having now described my invention, I claim:—

1. A purging system for files comprising in combination a succession of sets of wrappers, each adapted to be folded over and enclose the top edge of a file, designs comprising solid color, vertical stripes. oblique stripes and dots, applied to said sets of said wrappers across the line of fold therein, whereby from an inspection of the top of a file drawer, all files containing a particular design may be readily purged.

2. A purging system for file drawers, a wrapper adapted to be folded over the top edge of a file, a conspicuous mark applied to the wrapper across the line of the fold, in combination with a wrapper bearing a conspicuously different mark.

3. A purging system for files comprising in combination a succession of sets of wrappers, each adapted to be folded over and enclose the top edge of a file, conspicuously different designs applied to the said sets of wrappers across the line of fold therein whereby from inspection of the top of the file drawer, all files containing a particular design may be purged.

4. A purging device for a wrapper or the like, adapted to be folded over the top edge of a file, comprising a conspicuous mark on the wrapper, said mark arranged across the normal line of fold and extending a substantial distance above and below the same, whereby substantial variations in the position of the fold line are accommodated and said line made to intersect said mark.

5. A purging device for a wrapper or the like, adapted to be folded over the top edge of a file, comprising a conspicuous mark on the wrapper, said mark arranged across the normal line of fold and extending a substantial distance above and below the same, whereby substantial variations in the position of the fold line are accommodated and said line made to intersect said mark, said mark being so designed as to produce a uniform appearance along the line of fold wherever the said line intersects the mark.

6. A purging system for files, comprising in combination a succession of sets of wrappers, each adapted to enclose a file and each provided with a fold line forming the upper edge of the wrapper, designs comprising solid color, vertical stripes, oblique stripes and dots applied to said sets of said wrappers across the line of fold therein, whereby from an inspection of the top of a file drawer, all files containing a particular design may be readily purged.

7. A purging device for file drawers comprising a plurality of sets of wrappers adapted to be used in cyclic succession, each wrapper being constructed and arranged to enclose a file and each provided with a fold line forming a visible edge of the wrapper, and means located on each wrapper at the fold line for distinguishing each wrapper of a set from those of other sets and for determining the sequence of each set of wrappers in the cyclic succession.

8. A purging device for file drawers, comprising a plurality of sets of wrappers adapted to be used in cyclic succession, each wrapper being constructed and arranged to enclose a file and each provided with a fold line forming a visible edge of the wrapper, each wrapper of a set having a conspicuous mark applied thereto across the fold line, the marks of each set being conspicuously different, and a conspicuous numeral on each wrapper located at the fold line, the numerals of each set being different for determining the sequence of each set of wrappers in the cyclic succession.

9. A purging means for a file drawer comprising a wrapper constructed and arranged to contain a file, and provided with a fold line forming the upper edge of the wrapper, a conspicuous mark applied to the wrapper across the line of the fold, in combination with a similarly folded wrapper bearing a similarly arranged conspicuously different mark.

10. A purging means for files comprising in combination a succession of sets of wrappers each constructed and arranged to contain a file and each provided with a fold line forming the upper edge of the wrapper, conspicuously different designs applied to the said sets of wrappers across the line of fold therein whereby from inspection of the top of the file drawer, all files containing a particular design may be purged.

11. A purging device for a wrapper or the like, comprising a wrapper constructed and arranged to enclose a file, and provided with a fold line forming a visible edge of the wrapper when filed, a conspicuous mark on the wrapper arranged to extend across the normal line of fold and extending a substantial distance on each side of the same, whereby substantial variations in the position of the fold line are accommodated and said line made to intersect said mark.

In witness whereof, I hereunto subscribe my name to this specification.

LEWIS H. BROWN.